Dec. 23, 1952     W. B. HEBENSTREIT     2,623,198
TUNABLE MAGNETRON
Filed May 13, 1946     4 Sheets-Sheet 1
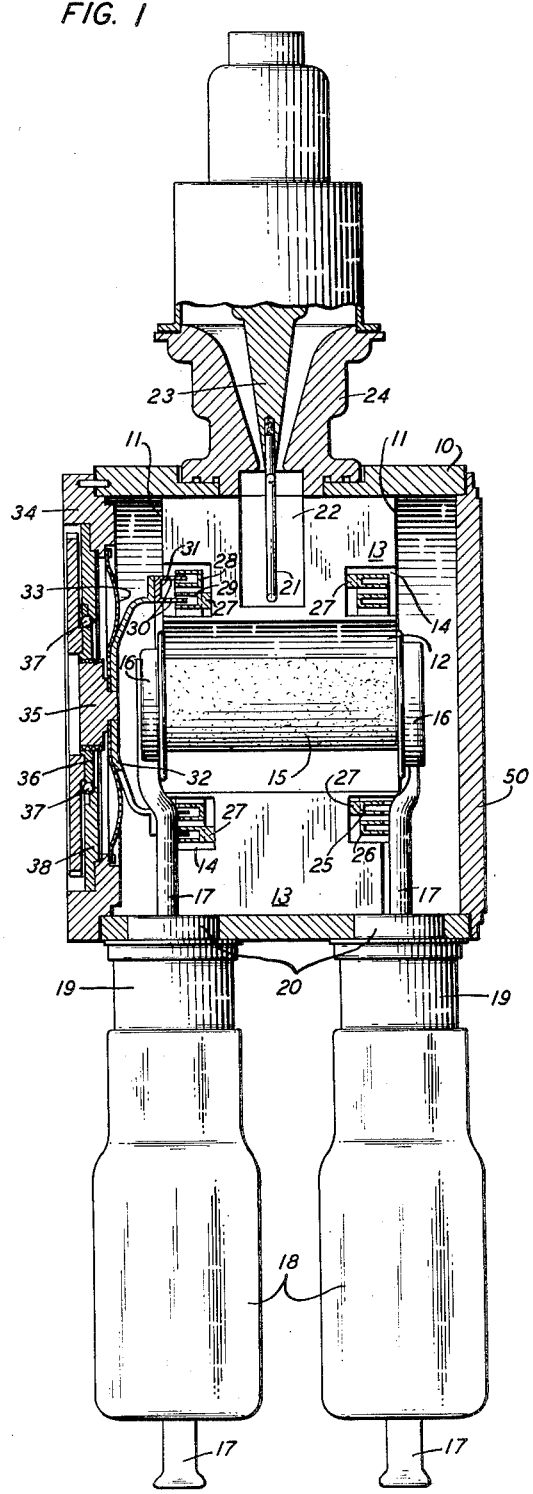
INVENTOR
W. B. HEBENSTREIT
BY
ATTORNEY Dec. 23, 1952 W. B. HEBENSTREIT 2,623,198
TUNABLE MAGNETRON
Filed May 13, 1946 4 Sheets-Sheet 2

INVENTOR
W. B. HEBENSTREIT
BY
*R. J. Guenther*
ATTORNEY

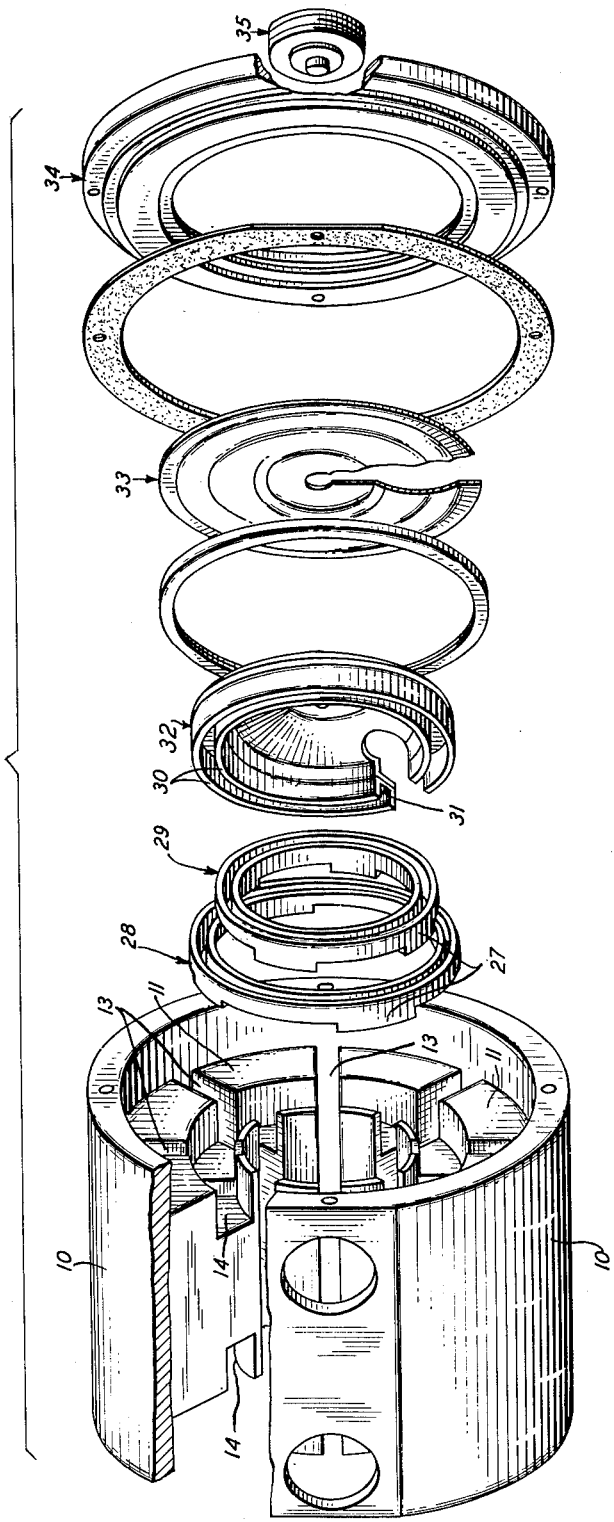

DEPTH OF INSERTION OF TUNER RINGS 30

INVENTOR
W. B. HEBENSTREIT
BY

ATTORNEY

Patented Dec. 23, 1952

2,623,198

UNITED STATES PATENT OFFICE 2,623,198

TUNABLE MAGNETRON

William B. Hebenstreit, New York, N. Y., assignor to Bell Telephone Laboratories, Incorporated, New York, N. Y., a corporation of New York Application May 13, 1946, Serial No. 669,213

9 Claims. (Cl. 315—40)

This invention relates to tunable high frequency circuits and more particularly to magnetrons of the multicavity resonator type.

Such magnetrons, in one form, comprise an annular anode divided into a plurality of segments by slots or bores which are constructed and arranged to define cavity resonators of a preassigned natural frequency. The slots or bores communicate with an aperture or bore in the anode, in which a cathode is located, and are coupled to one another by cavities or chambers at the ends thereof.

The resonant frequency of the circuit defined by the several resonators in combination is dependent, of course, upon the parameters of the elements defining the circuit and the coupling between the resonators. Inasmuch as a plurality of individually resonant elements are included in this circuit, the latter as a whole may oscillate in a variety of modes. In order to realize and emphasize oscillation of the system in a desired mode, coupling elements of predetermined parameters may be provided. In one form, commonly referred to as mode locking straps and an illustrative construction of which is disclosed in Patent No. 2,595,652 issued May 6, 1952 to James B. Fisk, these elements are concentric rings at the ends of the anode, the two rings being connected to respective groups of alternate anode segments.

Such coupling elements or mode locking straps introduce shunt capacitance and inductance in circuit with the resonator system and effect separation of the possible oscillating modes.

Multiresonator systems of the type above described are, of course, susceptible of tuning by varying a parameter of the system. For example, the principal resonant frequency may be varied by altering the coupling between the resonators. Two important effects, however, are notable in connection with presently known tuning systems of the type indicated. One is that as the coupling is varied, the oscillating mode may change so that the frequency range over which tuning may be realized without change in operating mode is limited. Secondly, a change in mode or approach to a condition near mode change or cross-over is attended by a decrease in output and operating efficiency.

One general object of this invention is to improve multiple element tunable systems and, more particularly, tunable multicavity resonator systems for magnetrons.

More specifically, objects of this invention are to increase the tuning range of multicavity resonator systems, and particularly to increase such range without alteration of the operating mode in magnetrons including such system, and to minimize variations in the output and operating efficiency of such magnetrons with tuning changes.

In accordance with one feature of this invention, in a magnetron of the general construction above described and including mode locking straps, tuning is effected by varying both the capacitance per unit length of the strap system and the inductance per unit length, the change in capacitance and inductance being of opposite sense, i. e., as the capacitance increases the inductance decreases, and vice versa.

In one illustrative embodiment of this invention, the mode locking straps at one end of the anode of the magnetron are concentric annuli of channel form into which a tuning member of concentric conductive rings, electrically integral, is adjustably insertable to effectively vary the interstrap capacitance and the cross-sectional area of the straps.

As the tuner rings are inserted into the channeled straps, the interstrap capacitance increases, the effect of which is to increase the wavelength of the oscillating frequency in the desired mode. Also the strap inductance decreases the wavelength for other modes. Consequently the mode frequencies separate. Thus, an increase in possible tuning range without change of operating mode is realized. Also, mode cross-over regions are avoided so that uniform power output and operating efficiency over a wide frequency range are attained.

The invention and the above-noted and other features thereof will be understood more clearly and fully from the following detailed description with reference to the accompanying drawing in which:

Fig. 1 is a side elevational view, partly in section, of a portion of a multicavity resonator magnetron, illustrative of one embodiment of this invention;

Fig. 2 is an end view of the anode included in the magnetron shown in Fig. 1;

Fig. 4 is an exploded perspective view of the anode and parts of the tuning mechanism of the magnetron shown in Figs. 1 and 3;

Fig. 5 is a circuit analog of a portion of the tunable oscillating circuit of the magnetron.

Figure 3:
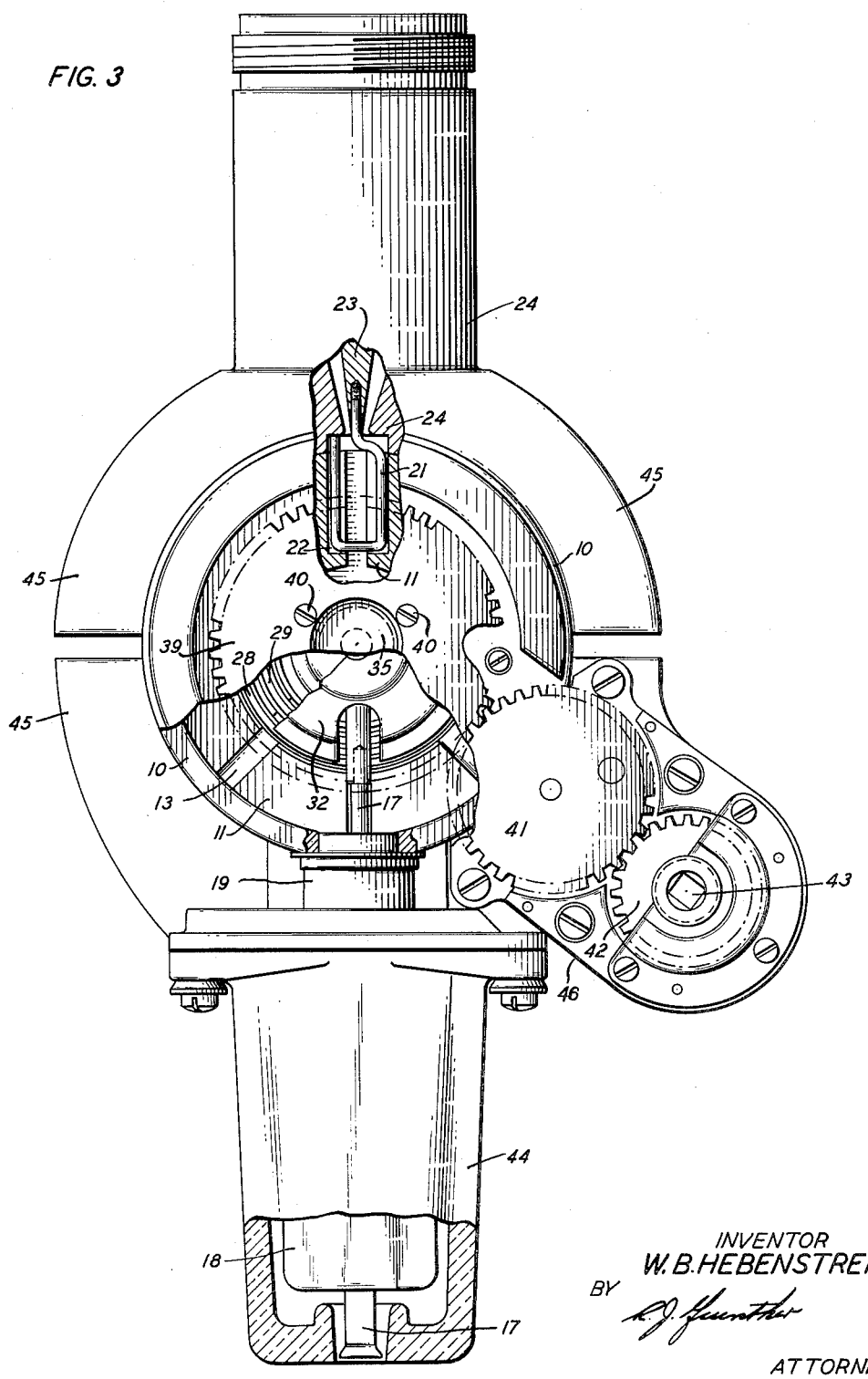
Fig. 3 is an elevational front view, partly broken away, of a magnetron including the assembly illustrated in Fig. 1, and showing details of the external parts of the tuning mechanism.

Referring now to the drawing, the magnetron illustrated in Figs. 1 to 4 comprises a cylindrical metallic housing 10 having therein an annular anode 11, which may be fabricated integrally with the housing 10. The housing is sealed at one end by a metallic cover plate 50. The anode 11, as shown clearly in Fig. 2, is provided with a central cylindrical passage or bore 12 with which a plurality of equally spaced, radial slots 13, longitudinally coextensive with the anode, communicate. These slots, which divide the anode into a number, for example eight, of substantially identical segments, are dimensioned to define cavity resonators of preassigned natural frequency. The end faces of the anode 11 are provided with circular grooves or channels 14 coaxial with the central passage or bore 12.

Mounted coaxially within the passage 12 is a cylindrical cathode 15 of the equipotential, indirectly heated type, the outer surface of which is coated with electron emissive material. The cathode is provided with end members 16 to which rigid supports 17, which serve as leading-in conductors for the cathode, are affixed. The supports 17 extend through and are sealed hermetically to vitreous stems 18 which in turn are sealed to metallic tubulatures or sleeves 19. The latter are provided with reduced end portions 20 fitted in openings in the housing 10 and are sealed to the housing.

Power may be taken from the magnetron by way of a coupling loop 21 of generally rectangular form as shown in Fig. 3, disposed in a recess 22 in the anode 11 and intersecting one of the cavity resonator slots 13. One end of the loop 21 is connected to the anode; the other end is connected to the inner conductor 23 of a hermetically sealed coaxial line. The outer conductor 24 of this line is sealed hermetically to the housing 10. As shown clearly in Figs. 1 and 3, the conductors 23 and 24 have juxtaposed tapered portions to provide a substantially constant characteristic impedance along the coaxial line.

Disposed within the channel or recess 14 at one end of the anode 11 are coaxial, annular, channeled mode locking straps 25 and 26. These straps, which may be formed or machined of metal, such as copper, are provided with equally spaced feet or protuberances 27, the feet on the two being in alternate arrangement as shown clearly in Fig. 4. The feet on one strap are affixed, as by brazing, to one group of alternate anode segments, whereby these segments are connected directly by the strap. The other strap similarly connects the other alternate anode segments.

A second pair of mode locking straps 28 and 29 identical with the pair 25, 26 is mounted in the channel or recess 14 at the other end of the anode 11. As illustrated in Fig. 1, the strap 28 interconnects the same alternate anode segments as the strap 25 and the strap 29 similarly connects the same alternate anode segments as the strap 26.

Advantageously the channels in the several straps are sharply rectangular.

The several straps provide shunt capacitance and inductance in circuit with the circuit defined by the several cavity resonators and, although the number of possible modes of oscillation of the circuit remain unaffected, the straps effect a separation of the modes. By appropriate correlation of the parameters of the system, and particularly of the straps, the tendency of the system to oscillate in a preassigned mode is enhanced.

Adjustably insertable into the channels in the straps 28 and 29 is a metallic tuning member having concentric annular proportions 30, for example, of silver-plated copper integral with a bridge portion 31, each portion 30 being of a diameter substantially equal to the mean diameter of the associated strap 28 or 29 and being relatively thin to remain clear of the associated strap. The mechanism for adjusting the tuning member position will be described presently.

As the tuning member is inserted into the straps 28 and 29, it varies the characteristics of the straps and the circuit parameters of the system defined by the straps and the cavity resonators. More specifically, the effect of the insertion of the portions 30 into the strap channels is to increase the capacitance per unit length of the strap system by increasing the interstrap capacitance and to decrease the inductance per unit length by effectively increasing the cross-sectional area of the straps. The effect of increase in strap capacitance is to increase the wavelength of the desired mode; the effect of decrease in inductance is to decrease the wavelength of lower order modes. Consequently, a separation of the mode frequencies results and tuning over a wide range without mode changes and substantial variation in output and operating efficiency are realized.

A simplified circuit analog of the tuning system is shown in Fig. 5 wherein four anode segments are coupled by the mode locking straps 28 and 29. The tuner 30, 31 together with the straps defines the variable capacitances.

Figure 6:
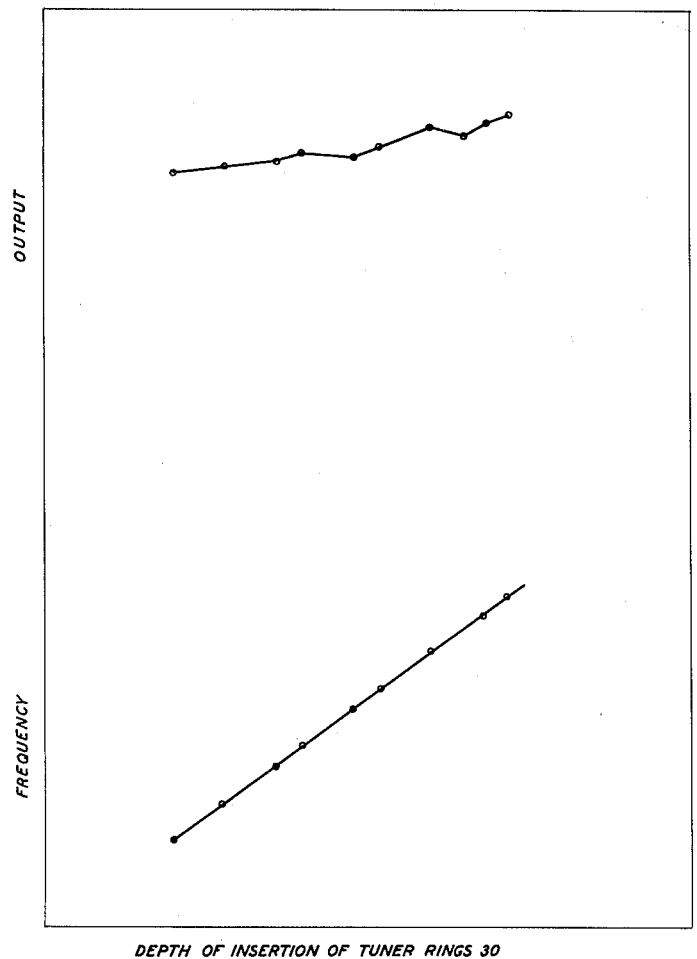
Fig. 6 is a graph illustrating operating characteristics of a typical magnetron constructed in accordance with this invention.

Characteristics of a typical magnetron having a tuning system constructed in accordance with this invention are shown in Fig. 6. It will be noted that the resonant frequency of the oscillating system varies linearly with depth of insertion of the tuner rings 30 and that the output of the magnetron varies but little over the tuning range.

The mechanism for effecting motion of the tuning member to adjust the position thereof relative to the straps 28 and 29 comprises, as illustrated in Figs. 1, 3 and 4, a metallic bridge 32 upon which the tuning member is mounted. The bridge 32 is joined to a diaphragm 33 which is joined hermetically to a metallic ring 34 in turn sealed to one end of the housing 10. Affixed to the bridge and diaphragm is an externally threaded stud 35 the threads of which mesh with a gear member 36 mounted rotatably by ball bearings 37 in a race member 38.

The gear member 36 is secured to a gear 39, as by screws 40, as shown in Fig. 3, and the gear 39 is arranged to be driven by the gear train 41 and 42 mounted by an arm 46 affixed to the housing 10. The gear 42 is provided with a suitable stud 43 for accommodating a key or other driving member.

As shown in Fig. 3, the stems 18 and sleeves 19 may be enclosed in a protective housing 44 affixed to the housing 10. Also, the housing may be provided with fins 45 to increase the heat radiation from the device and maintain it at a safe operating temperature.

Although a specific embodiment of this invention has been shown and described, it will be understood that it is but illustrative and that various modifications may be made therein departing from the scope and spirit of the invention as defined in the appended claims.

What is claimed is:

1. A tunable circuit comprising a cylindrical conductive body divided into a plurality of segments by cavity resonator defining slots, a first conductive ring member electrically connecting one group of said segments, a second conductive ring member electrically connecting another group of said segments and adjacent said first ring member, a conductive annulus in direct juxtaposition to and overlying both of said ring members, and means coupled thereto for moving said annulus toward and away from said ring members to vary the capacitance between said ring members.

2. A tunable circuit comprising a cylindrical conductive body divided into a plurality of segments by cavity resonator defining slots, a first conductive ring member at one end of said body, coaxial therewith and electrically connecting one group of alternate segments, a second conductive ring member electrically connecting the remaining segments and adjacent and encompassing said first ring member, and means including an annular member in juxtaposition to and capacitatively bridging said ring members for varying the capacitance therebetween.

3. A tunable circuit comprising a cylindrical conductive body divided into a plurality of segments by radial cavity resonator defining slots, a pair of concentric conductive ring members at one end of said body and coaxial therewith, one of said ring members being electrically connected to one group of alternate segments and the other of said ring members electrically connecting the remainder of said segments, a conductive annulus adjacent, coaxial with and capacitatively bridging said ring members, and means coupled thereto for displacing said annulus axially to adjust the capacitance between said ring members.

4. A tunable circuit comprising a conductive body divided into a plurality of sections by cavity resonator defining slots, a first channeled conductive member electrically connecting certain of said sections, a second channeled conductive member electrically connecting other of said sections and adjacent said first conductive member, tuner members connected electrically to each other and extending into said channeled members, and means connected to said tuner members for adjusting the extent to which said tuner members extend into said channeled members.

5. A tunable circuit comprising a cylindrical conductive body divided into a plurality of segments by cavity resonator defining slots, a pair of inner and outer, channeled, annular conductive members at one end of said body, the inner conductive member electrically interconnecting one group of said segments and the outer conductive member electrically interconnecting another group of said segments, a tuning member comprising a pair of electrically integral metallic annuli each extending into a respective channeled member, and means coupled to said annuli for varying the extent to which said annuli project into said channeled members.

6. A tunable circuit comprising a cylindrical conductive body divided into a plurality of segments by cavity resonator defining slots, a pair of inner and outer annular conductive members at one end of said body, one of said members electrically interconnecting one group of alternate segments and the other of said members electrically interconnecting the other alternate segments, a pair of conductive annuli, each adjacent a respective conductive member, said annuli being electrically integral, and means coupled thereto for displacing said annuli to vary the capacitance between said conductive members.

7. A magnetron comprising a cylindrical anode having a bore extending therethrough and divided into a plurality of segments by cavity resonator defining slots extending outwardly from said bore, a cathode within said bore, a first mode locking strap at one end of said anode and electrically interconnecting a group of said segments, a second mode locking strap adjacent said first strap and electrically interconnecting another group of said segments, a tuning member including a pair of electrically connected conductive members each adjacent a respective mode locking strap, and means connected to said conductive members for adjustably moving said conductive members to vary the capacitance between said straps.

8. A magnetron comprising a cylindrical anode having a bore extending therethrough and divided into a plurality of segments by cavity resonator defining slots extending outwardly from said bore, a cathode within said bore, a first annular mode locking strap at one end of said anode and electrically interconnecting one group of alternate segments, a second annular mode locking strap encircling said first strap and electrically interconnecting other segments, a tuning member including a pair of paraxial conductive annuli electrically connected together and each adjacent and substantially coaxial with a respective strap, and means coupled thereto for adjustably displacing said annuli axially.

9. A magnetron comprising a cylindrical anode having a bore extending therethrough and divided into a plurality of segments by cavity resonator defining slots extending outwardly from said bore, a cathode in said bore, a pair of inner and outer annular, channeled, mode locking straps at one end of said anode and coaxial with said bore, the inner strap electrically interconnecting one group of alternate segments and the outer strap electrically interconnecting the remaining alternate segments, a pair of coaxial, conductive annuli, each extending into a respective channeled strap, means electrically connecting said annuli, and means connected thereto for simultaneously displacing said annuli axially thereby to vary the extent to which said annuli extend into said straps.

WILLIAM B. HEBENSTREIT.

REFERENCES CITED

The following references are of record in the file of this patent:

UNITED STATES PATENTS

| Number | Name | Date |
|---|---|---|
| 2,272,211 | Kohler | Feb. 10, 1942 |
| 2,408,234 | Spencer | Sept. 24, 1946 |
| 2,408,235 | Spencer | Sept. 24, 1946 |
| 2,408,903 | Biggs et al. | Oct. 8, 1946 |
| 2,414,085 | Hartman | Jan. 14, 1947 |
| 2,418,469 | Hagstrum | Apr. 8, 1947 |
| 2,422,465 | Bondley | June 17, 1947 |
| 2,424,496 | Nelson | July 22, 1947 |
| 2,449,090 | Spencer | Sept. 14, 1948 |